United States Patent [19]
Ross

[11] Patent Number: 6,040,553
[45] Date of Patent: Mar. 21, 2000

[54] METHOD OF MANUFACTURING AIR CONVEYOR PANELS BY LASER ABLATION DRILLING

[75] Inventor: Yvan Ross, Richelieu, Canada

[73] Assignee: GEBO Conveyors Consultants & Systems, Inc., Canada

[21] Appl. No.: 09/182,331

[22] Filed: Oct. 29, 1998

[51] Int. Cl.⁷ .................................................. B23K 26/00
[52] U.S. Cl. ...................................... 219/121.71; 406/88
[58] Field of Search ........................... 219/121.7, 121.71; 406/88

[56] References Cited

U.S. PATENT DOCUMENTS

| | | |
|---|---|---|
| 3,684,327 | 8/1972 | Hurd . |
| 3,734,567 | 5/1973 | Fong . |
| 4,500,229 | 2/1985 | Cole et al. . |
| 4,616,960 | 10/1986 | Gladish ..................................... 406/88 |
| 5,293,025 | 3/1994 | Wang ................................. 219/121.71 |
| 5,456,556 | 10/1995 | Petrovic . |
| 5,580,446 | 12/1996 | Markham . |
| 5,726,411 | 3/1998 | Abreu et al. ........................ 219/121.71 |

*Primary Examiner*—Geoffrey S. Evans
*Attorney, Agent, or Firm*—Lee, Mann, Smith, McWilliams, Sweeney & Ohlson

[57] ABSTRACT

An automated method of manufacturing an air conveyor panel. The panel includes an array of holes used as air nozzles. The method generally includes the steps of mapping with a computer the desired location, shape and axial orientation of cavities to be machined in the panel, sequentially directing a laser beam at each desired location of cavities also with the computer; sequentially laser ablation drilling cavities by photothermally vaporizing a portion of the panel at each desired location. A major portion of the cavities consists of holes piercing the panel for use as air nozzles. The laser beam has an intensity sufficient to photothermally vaporize a portion of the panel at each desired location. In a preferred embodiment, the panel is constructed of steel and has a thickness of about 0.1 to 1.2 cm while the nozzles have a diameter of ¾ mm to 2 mm.

8 Claims, 3 Drawing Sheets

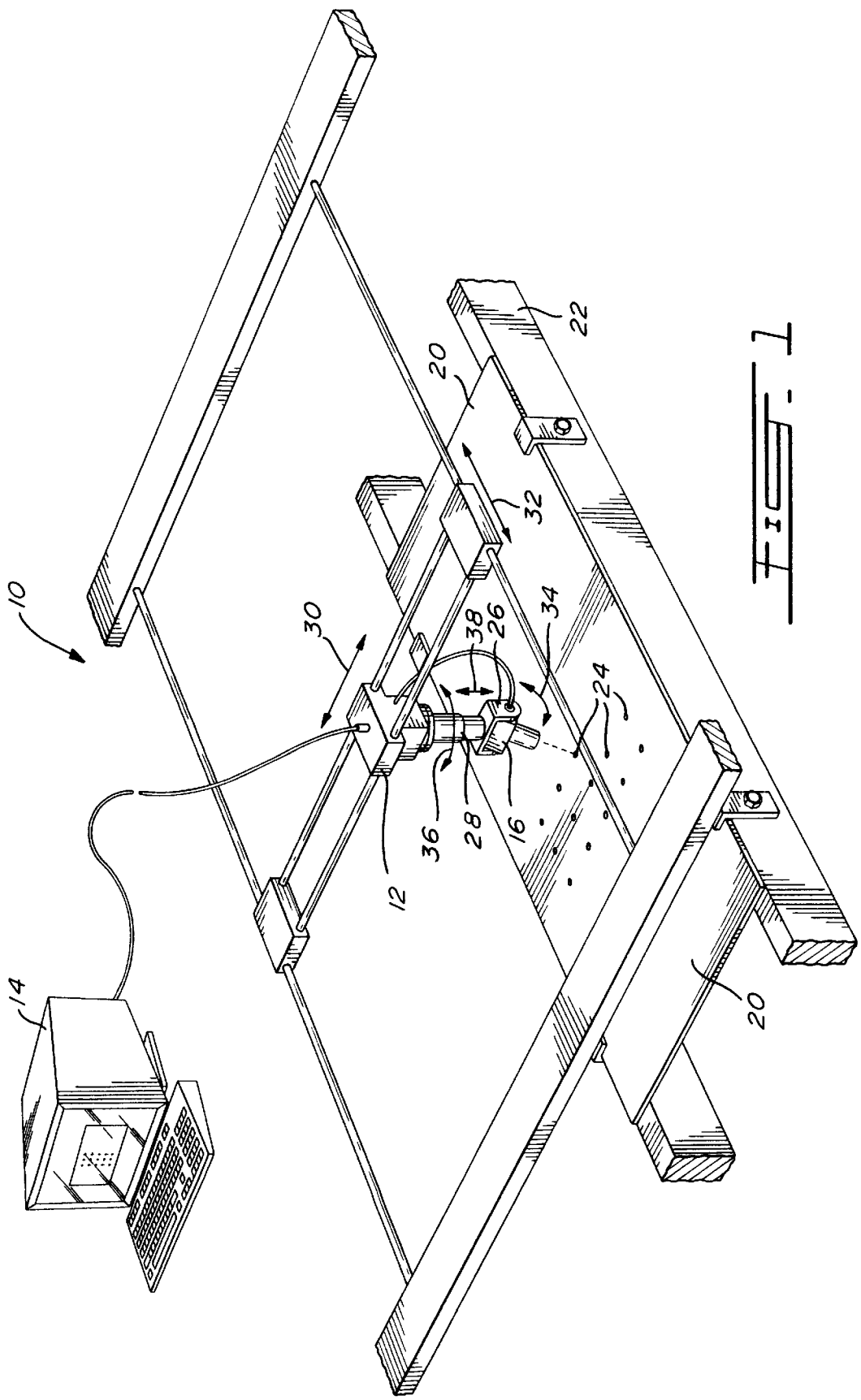

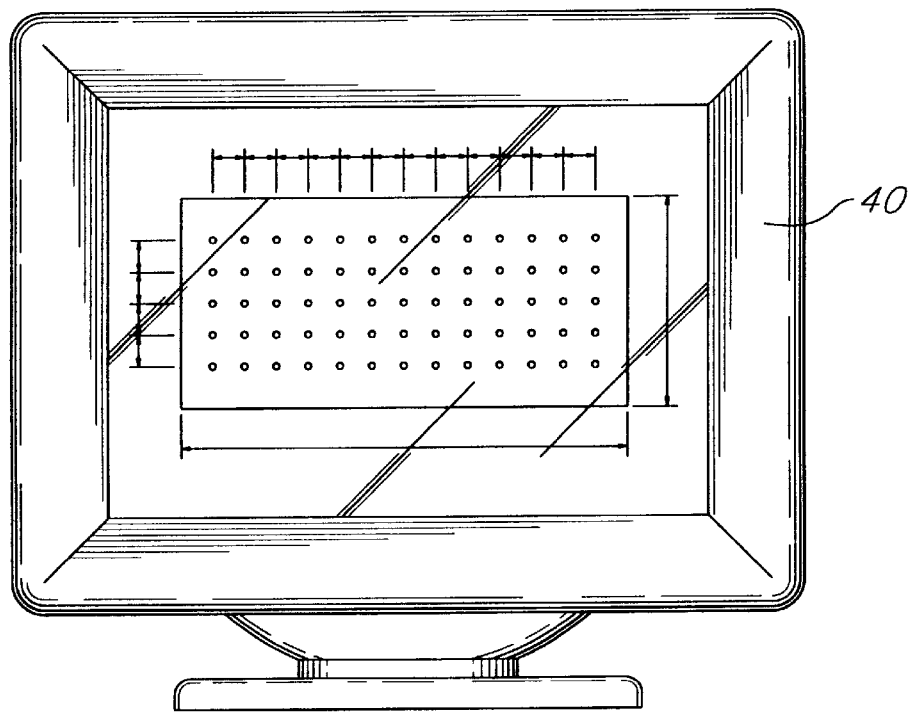
FIG_2
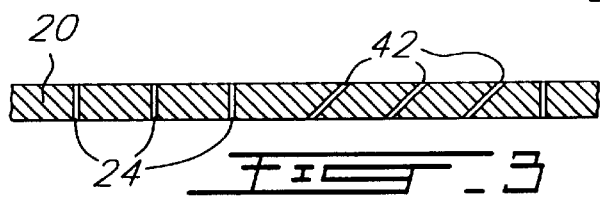
FIG_3
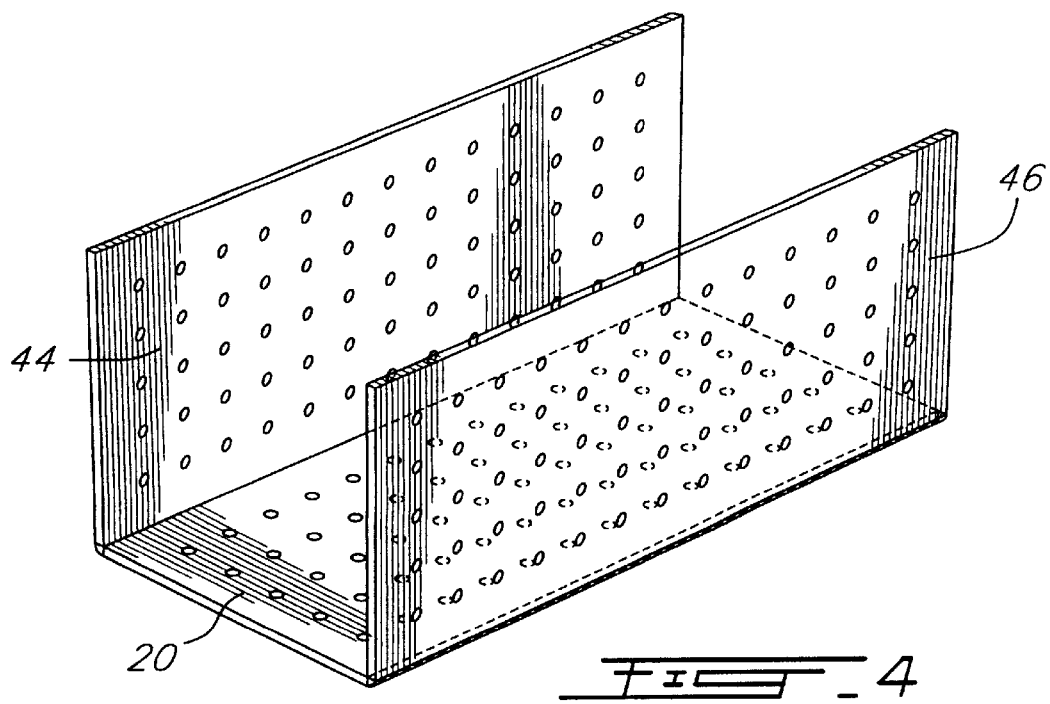
FIG_4

METHOD OF MANUFACTURING AIR CONVEYOR PANELS BY LASER ABLATION DRILLING

FIELD OF THE INVENTION

The present invention relates to a method of manufacturing air conveyor panels. More specifically the present invention relates to a method of machining small diameter air nozzles in modular panels for later assembly into an air conveyor.

BACKGROUND OF THE INVENTION

Air conveyors are known in the art and use directed air flows to move articles from one location to another. The air flows can support and move the articles. Examples of air conveyors are provided in U.S. Pat. Nos. 3,684,327, 4,500,229, 4,369,005 and 3,734,567.

These conveyors commonly include a longitudinal plenum containing pressurized air and having an upper panel provided with a pattern of air nozzles. Articles riding the conveyor actually ride on the air cushion created by air escaping the nozzles under pressure. The upper panel is commonly provided with side walls so as to form a U-shaped channel wherein articles are conveyed.

A number of air conveyor variations are known in the art. For example, the size, placement and orientation of nozzles can vary. To urge articles in a predetermined direction, an array of nozzles have an oblique-axis orientation with respect to the planar surface defined by the conveyor upper panel. When only lift is required, nozzles are oriented at right angle with respect to the upper panel. Also, the size and shape of the nozzles may vary. The best control over the articles being conveyed is usually obtained when the nozzles are numerous, quite small in diameter and the pressure inside the plenum is high. This will result in good conveying performance obtained by precise, high velocity air jets impacting and directing the articles being conveyed.

In manufacturing air conveyor panels, it is known to use metallic, polymeric or composite materials. However, in many materials, it is not technically possible to create very small nozzles by conventional drilling or punching techniques. This is a major drawback, because the use of larger diameter nozzles compels air conveyor designers to produce high volume, low pressure conveyors. As a further drawback, when machining oblique-axis nozzles, it is common to use a two step method including a first step of drilling or punching a right angle bore to a predetermined depth in the conveyor upper panel followed by a second step of drilling or punching an oblique-axis hole starting at the depth of the right angle bore.

To overcome some of these drawbacks of the prior art, it is known from U.S. Pat. No. 5,456,556, to prepare an upper conveyor panel provided with large nozzles adapted to receive nozzle inserts which are friction fitted into each large nozzle. The nozzle inserts are usually molded with small diameter nozzles of any given orientation. Although such arrangement is meritorious, each nozzle insert is installed by hand. The injection molding of nozzle inserts also adds expense to the overall cost of manufacture. Thus, this technique has so far received limited favour in a mass-production setting.

It is also known to use lasers for drilling or machining workpieces for example when making semi conductors (see for example U.S. Pat. No. 5,580,446). However, the prior art does not teach the use of laser to manufacture air conveyor panels.

Consequently, there remains a need for an improved, low cost, high production method of manufacturing air conveyor panels which overcome the drawbacks of the prior art.

OBJECTS OF THE INVENTION

An object of the present invention is to provide a precise and cost-effective method for obtaining air conveyor panels provided with nozzles located, oriented and sized in accordance with chosen performance requirements.

Another object of the present invention is to provide a method for not only machining nozzles but also other machinery requirements such as providing markings, cavities, fastening apertures, etc.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

SUMMARY OF THE INVENTION

Generally speaking, the present invention provides an automated method of manufacturing an air conveyor panel, the panel comprising an array of holes used as air nozzles, the method comprising the steps of:

(a) mapping the desired location, shape and axial orientation of cavities in said panel with a computer;

(b) sequentially directing a laser beam at each desired location of cavities with said computer;

(c) sequentially laser ablation drilling said cavities by photothermally vaporizing a portion of said panel at each desired location, a major portion of said cavities consisting of holes piercing said panel for use as the air nozzles, and wherein the laser beam has an intensity sufficient to photothermally vaporize a portion of said panel at each desired location.

In a preferred embodiment, the panel is constructed of steel and has a thickness of about 0.1 to 1.2 cm while the nozzles have a diameter of ¾ mm to 2 mm.

BRIEF DESCRIPTION OF THE DRAWINGS

FIG. 1 is a schematic perspective view of a laser apparatus for use in carrying out the method of the present invention;

FIG. 2 is a schematic front elevational view of a computer screen displaying thereon a grid pattern of apertures to be laser drilled into an air conveyor panel in accordance with the method of the present invention;

FIG. 3 is a cross-sectional view of a portion of an air conveyor assembly manufactured in accordance with the method of the present invention.

FIG. 4 is a schematic perspective view of a portion of an air conveyor panel assembly of panels manufactured in accordance with the present invention.

DETAILED DESCRIPTION

Figure 5:
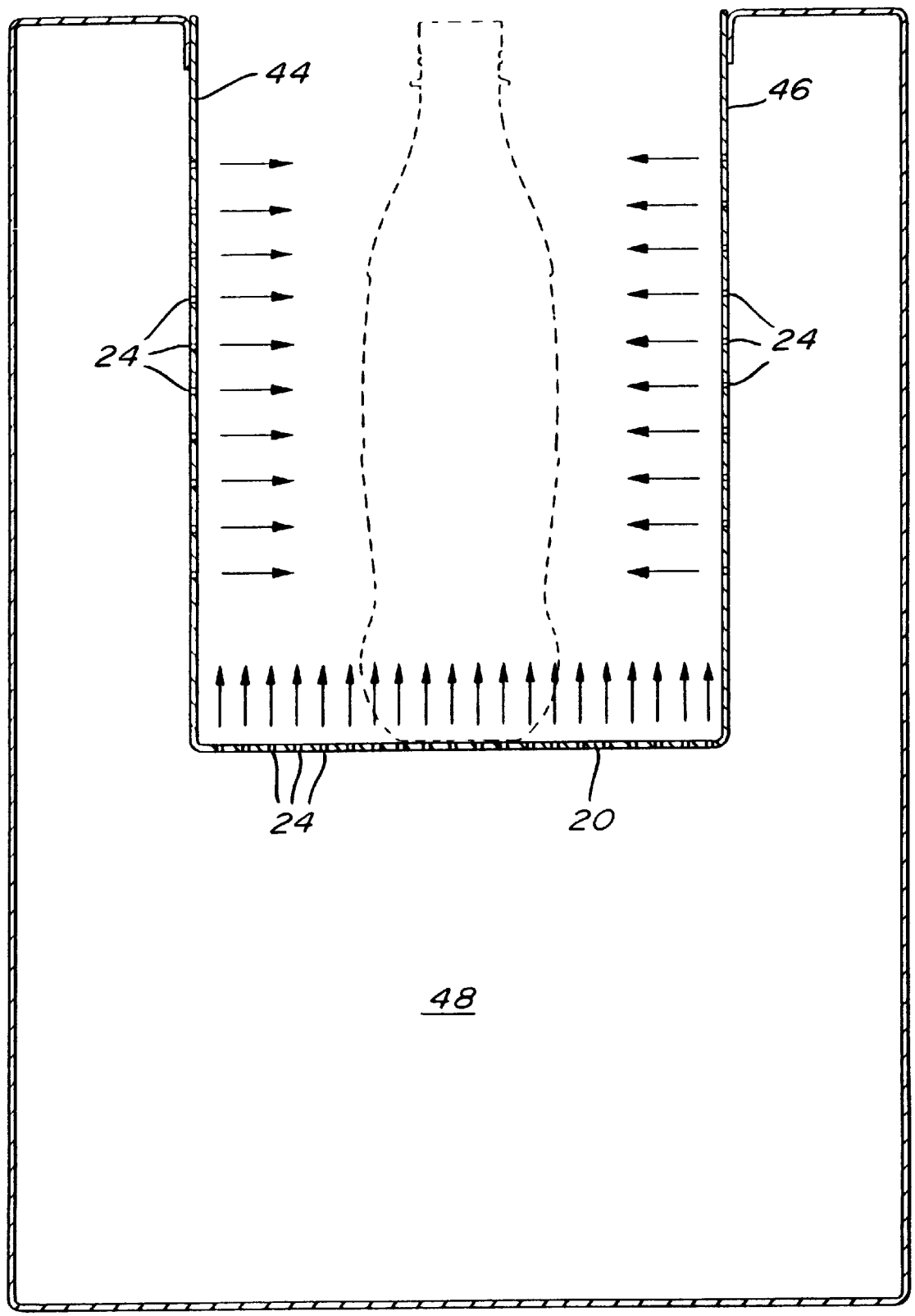
FIG. 5 is a schematic front cross-sectional view of an air conveyor panel assembly comprising conveying tray and side panels provided with nozzles manufactured in accordance with the present invention.

FIG. 1 shows a perspective view of the equipment used in the set-up for the method of manufacture of the present invention. The equipment is generally designated by reference numeral 10. A motion controller 12 connects a computer 14 to a laser 16. In the configuration shown in FIG. 1, motion controller 12 is mounted on support bracket 18. The air conveyor panel 20 to be machined in accordance with the present invention is secured in place on retaining fixture 22.

The laser 16 produces a laser beam which is focused on panel 20 for laser ablation drilling of small diameter holes in panel 20. When the laser beam strikes the surface of panel 20, the hitting energy is sufficient to cause a photothermal reaction such as melting or vaporization thereby piercing small diameter holes 24 in panel 20. It will be readily understood by one skilled in the art, that the type of laser used, power density used, and pulse duration can be chosen to achieve a purpose of piercing panel 20 without causing warping or unnecessary localized melting of panel 20.

In a preferred embodiment, panel 20 is maintained in fixed position on retaining fixture 22 while laser 16 is displaced at will by motion controller 12 under the direction of computer 14. Optionally, laser 16 could be held in fixed position while the work piece is being moved. Also, optionally both laser 16 and panel 20 could be moved. However, in general, it is faster to displace the laser than the workpiece. Additionally, an inert shielding gas such as argon, nitrogen or helium could be used to prevent the formation of undesired by-products of laser ablation and prevent laser lens contamination. Optionally, a vacuum system could also be provided to draw gaseous by-products away from panel 20 while laser drilling was done.

Laser 16 is preferably pivotally mounted on a fork shaped support 26 itself mounted below telescopic shaft 28 itself rotatively mounted to motion controller 12. In operation, computer 14 uses a software to map out a grid array of holes 24 to be laser drilled in a given panel 20. As one skilled in the art will readily understand, the location, size and axis orientation of each hole 24 in relation to panel 20 is calculated for the intended performance requirements of the air conveyor 20.

The computer 14 has the ability, through suitable interfaces, to issue commands for laser beam placement, axial orientation, focus, intensity as well as pulse duration. Because laser 16 can be oriented in five (5) axes, generally designated by arrows 30 to 38, holes 24 can be laser drilled at a chosen axis angle ranging from 90° to about 15°. Thus, resulting holes 24 will constitute nozzles capable of ejecting pressurized air in a preselected direction. It is to be understood that motion controller 12 and laser 16 will be under numerical control and responsive to commands issued by computer 14 in accordance with a pre-programmed routine and through suitable interfaces.

Although panels 20 can be constructed of polymeric or composite materials, metallic panels can also be laser drilled. For example, panel 20 could be formed of rolled stainless steel. The strength of the material constituting panel 20 will in itself provide the structural rigidity of the panel once installed in an air conveyor. When stainless steel is used for panel 20, it is conceivable that the panel may be of a thickness of 0.1 cm to 1.2 cm. Of course, laser 16 can be used for other machining operations on panel 20 such as to drill fastening apertures, to score groves or provide other markings or welds on panel 20.

Turning now to FIG. 2 there is shown a schematic view of the display screen 40 of computer 14. There can be seen a graphic representation of panel 20 together with a calculated array of holes to be laser drilled into the panel.

Preferably, holes 24 drilled into panel 20 by laser 16 are of a diameter of ¾ mm to 2 mm. Such small holes 24 will therefore permit to operate an air conveyor under high pressure and high air nozzle velocity. Once in operation, such an air conveyor will allow greater control over the articles being conveyed and provide the capability of handling heavier items.

Turning now to FIG. 3, there is shown a side elevation view of portions of panel 20 resulting from the method of manufacture of the present invention. Holes 24 are shown after laser drilling at right angle with respect to panel 20 while holes 42 are shown after angled laser drilling into panel 20. Once in operation, panel 20 will allow air jets to escape from holes 24 and 42 and impart the required motions on articles being conveyed.

Turning now to FIG. 4, there is shown a partially assembled air conveyor comprising panels 20, 44 and 46 manufactured in accordance to the method of the present invention. Thus, it is shown that panels comprising air jets can also be provided on the side walls 44 and 46 of the air conveyor. Such an arrangement is more readily seen from FIG. 5 wherein a plenum 48 surrounds panels 20, 44 and 46 which define a U shaped channel in which articles are being conveyed. Thus, greater control and less damage to articles being conveyed can be achieved by using side panels comprising air nozzles.

Although the invention has been described above with respect with one specific form, it will be evident to a person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. An automated method of manufacturing an air conveyor panel, the panel comprising an array of holes used as air nozzles, the method comprising the steps of:
   (a) mapping the desired location, shape and axial orientation of cavities in said panel with a computer;
   (b) sequentially directing a laser beam at each desired location of cavities with said computer;
   (c) sequentially laser ablation drilling said cavities by photothermally vaporizing a portion of said panel at each desired location, a major portion of said cavities consisting of holes piercing said panel for use as the air nozzles, and
wherein the laser beam has an intensity sufficient to photothermally vaporize a portion of said panel at each desired location.

2. The method of claim 1 wherein said step (c) of sequentially laser drilling said cavities by photothermal vaporization comprises providing an inert shielding gas to prevent the formation of undesired byproducts of the laser drilling and to prevent laser lens contamination.

3. The method of claim 1 wherein said step (c) of sequentially laser drilling said cavities by photothermal vaporization comprises providing a vaccum source to draw away any undesired byproducts of the laser drilling and to prevent laser lens contamination.

4. The method of claim 1 wherein said holes have an average diameter of about ¾ mm to 2 mm.

5. The method of claim 1 wherein said panel is selected from the group of materials consisting of polymeric materials, composite materials or metallic materials or mixtures thereof.

6. The method of claim 5 wherein the material of said panel is metallic.

7. The method of claim 6 wherein the material of said panel is steel.

8. The method of claim 7 wherein said panel is of an average thickness of about 0.1 to 1.2 cm.

* * * * *